S. E. Tyler,
Bed Bottom,

N° 79,705. Patented July 7, 1868.

United States Patent Office.

SALMON E. TYLER, OF BELOIT, WISCONSIN, ASSIGNOR TO HIMSELF AND WILLIAM S. STEPHENS, OF SAME PLACE.

Letters Patent No. 79,705, dated July 7, 1868.

IMPROVED SPRING-BED BOTTOM.

The Schedule referred to in these Letters Patent and making part of the same.

TO ALL WHOM IT MAY CONCERN:

Be it known that I, SALMON E. TYLER, of Beloit, county of Rock, in the State of Wisconsin, have invented certain new and useful Improvements in Spring-Bed Bottoms; and I do hereby declare that the following is a full, and exact description thereof, reference being had to the accompanying drawings, and to the letters of reference marked thereon, forming a part of this specification.

To enable others skilled in the art to make and use my invention, I will proceed to describe its construction.

My improvement in spring-bed bottoms, herein described, may be attached to and used on bedsteads constructed in any of the known forms.

Figure 1 represents a side view of a bedstead provided with my device for securing the rubber spring C to the slat A, showing a section of the slat A with the rubber-cloth spring C. The latter is secured to the slat A by the clamp B and corrugated eccentric b, the said rubber-cloth spring C being firmly secured to the head and foot-boards of the bedstead by the peculiar-shaped clasp D and screws d.

Figure 2 is a top view of the bedstead complete, with the slats A and springs C, as secured thereto, by the employment of my said invention, to wit, the said clamps B, corrugated eccentrics b, the said peculiar-shaped clasps D, with screws d.

Figure 3 is an enlarged side sectional view of the slat A, with rubber spring C, clamp B, corrugated eccentric b, clasp D, and screw d.

Figure 4 is an under side view of the same.

The nature of my invention, as already shown, consists in the employment of the said clamps B, combined with the said eccentrics b, for the purpose of firmly holding the rubber spring C to the ends of the slats A, which is easily effected by passing the ends of the said rubber springs C under the ends of the slats A, and between the lower side thereof and the said corrugated surface of the said eccentrics, b, then by drawing endwise on the rubber spring C and slat A, respectively, and at the same time, thus producing a rotary action of the eccentric, b, by which the rubber spring C is impacted with and firmly held between the eccentrics b and slat A, as shown. The rubber spring C is lapped around the clasp D, as described, which are firmly held to the ends of the bed-frame, as described, all which is clearly shown by the drawings herewith.

What I claim as my invention, and desire to secure by Letters Patent, is—

The clamps B and corrugated eccentrics b, as and for the purpose herein set forth and described.

Witnesses:
  W. S. STEPHENS,
  J. C. CONVERSE.

SALMON E. TYLER.